(12) United States Patent
Kunimoto (10) Patent No.: US 8,184,829 B2
(45) Date of Patent: May 22, 2012

(54) SIGNAL PROCESSING DEVICE AND METHOD OF PROCESSING SIGNAL

(75) Inventor: Toshifumi Kunimoto, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1125 days.

(21) Appl. No.: 11/972,588

(22) Filed: Jan. 10, 2008

(65) Prior Publication Data

US 2008/0175415 A1    Jul. 24, 2008

(30) Foreign Application Priority Data

Jan. 12, 2007   (JP) ................................. 2007-004054

(51) Int. Cl.
*H04B 1/00* (2006.01)
(52) U.S. Cl. ......................................... 381/119; 700/94
(58) Field of Classification Search .................. 381/119; 700/94
See application file for complete search history.

(56) References Cited

U.S. PATENT DOCUMENTS

| 4,998,960 A * | 3/1991 | Rose et al. ..................... 84/622 |
| 2005/0120870 A1 * | 6/2005 | Ludwig ........................... 84/661 |

FOREIGN PATENT DOCUMENTS

| JP | 06-324681 A | 11/1994 |
| JP | 07-121174 A | 5/1995 |
| JP | 2004-012842 A | 1/2004 |

OTHER PUBLICATIONS

Notice of Grounds for Rejection (Office Action) mailed Dec. 6, 2011, for JP Patent Application No. P2007-004054, with English Translation, four pages.

* cited by examiner

*Primary Examiner* — Douglas Menz
(74) *Attorney, Agent, or Firm* — Morrison & Foerster LLP (57) ABSTRACT

A plurality of sets of prepared parameters are stored in a parameter memory. A first control knob can be moved over a predetermined operating range in which a plurality of predetermined positions are discretely defined. The plurality of sets of prepared parameters are respectively assigned to the plurality of predetermined positions. When a current operating position of the first control knob is positioned between any two adjacent positions of the plurality of predetermined positions, two sets of prepared parameters are read out from the parameter memory in accordance with the two adjacent positions corresponding to the current operating position of the first control knob, and the read-out two sets of prepared parameters are interpolated in accordance with the current operating position of the first control knob to obtain one set of interpolated parameters. The input signal is subjected to the signal processing using one set of interpolated parameters.

11 Claims, 6 Drawing Sheets

EXAMPLE OF A GROUP
OF SWEET SPOT DATA

| | EXAMPLE 1 | EXAMPLE 2 | EXAMPLE 3 |
|---|---|---|---|
| A | FOR GUITAR | EXTREMELY LIGHT COMPRESSION | WEAKER ATTACK FEEL |
| B | FOR BASE | LIGHT COMPRESSION | WEAK ATTACK FEEL ($-\alpha$) |
| C | FOR DRUM | COMPRESSION | ORIGINAL ATTACK |
| D | FOR VOCAL | HEAVY COMPRESSION | HEAVY ATTACK FEEL ($+\alpha$) |
| E | FOR MASTER | LIMITER | HEAVIER ATTACK FEEL |

SIGNAL PROCESSING DEVICE AND METHOD OF PROCESSING SIGNAL

BACKGROUND

The present invention relates to a signal processing device and a method of processing a signal that are suitable to be used in a digital mixer or the like.

In a recent digital mixer, a compressor for controlling dynamics of audio signals is provided for each input/output channel. A characteristic of the compressor is determined by means of plural kinds of parameters. Thus, it lacks possibility (or realizability) that control knobs for setting these parameters are provided for every channel. For this reason, Japanese Patent Application Laid-open Publication No. 2004-012842 discloses a digital mixer (digital recorder) in which a display for adjusting a characteristic of a compressor or the like in one channel and various control knobs (operators) are provided on a panel, and the characteristic of the compressor in one selected input/output channel (referred to as a "selected channel") is set using this display and the various control knobs. Here, a plurality of knob images respectively corresponding to various parameters are displayed on the display and one parameter can be changed continuously by operating the corresponding knob image using a pointing device.

However, skill of a user is required to appropriately set various parameters that determine the characteristic of the compressor, and therefore it is difficult for beginners to do so. For this reason, Japanese Patent Application Laid-open Publication No. 2004-012842 discloses a technique in which one kind of parameter that monotonically decreases or increases in accordance with the amount of operation of the knob image is determined as a "standard parameter" among the plural kinds of parameters and other kinds of parameters are set in conjunction with the standard parameter. Namely, a table for associating a value of the standard parameter with a value of each of the other kinds of parameters is stored in a memory, and the values of the various parameters are determined by reading out this table. For example, Japanese Patent Application Laid-open Publication No. 2004-012842 discloses a technique in which "output gain" or "threshold" of the plural kinds of parameters is determined as a standard parameter and the other kinds of parameters are changed in accordance with the standard parameter.

However, the following problems exist in the techniques described above.

First, in the techniques disclosed in Japanese Patent Application Laid-open Publication No. 2004-012842, there has been a problem that the other kinds of parameters are also fixedly determined when the standard parameter is determined. For example, in the case where the "threshold" is defined as the standard parameter, it is impossible to define a setup state of each of plural kinds of parameters with respect to a threshold value. Here, a set of a value of the standard parameter and values of the other corresponding parameters is called a "parameter set". In the case where a plurality of parameter sets each having musical "application of meaning" such as "for guitar", "for base" and "for drum", for example, are to be realized by means of the techniques of Japanese Patent Application Laid-open Publication No. 2004-012842, each of the parameter sets has to be determined so that a range of a parameter value of the standard parameter for each "application of meaning" is not overlapped. Thus, it is hard to appropriately set a value of the standard parameter in accordance with any purpose. As a result, it is impossible to realize the plurality of parameter sets each having such musical "application of meaning".

Further, in the techniques of Japanese Patent Application Laid-open Publication No. 2004-012842, when a value of the standard parameter is determined, a parameter set is determined. However, it is impossible that a part of the parameters in the determined parameter set is changed while interlocking relative to each other. Moreover, in a digital mixer in which a parameter such as a compressor for one channel selected by the user (selected channel) of a plurality of channels is set with a GUI using a large-sized display and a dedicated control knob (operator), it is required to provide the large-sized display and the dedicated control knob. It is difficult to adopt them in a general-purpose digital mixer (for amateurs, such a mixer has a small-sized structure) in view of a cost phase, a size phase and the like. On the other hand, it also lacks possibility (or realizability) that control knobs for setting a characteristic of a compressor are provided for each of input/output channels of all channel strips.

SUMMARY OF THE INVENTION

In view of the foregoing, it is a first object of the present invention to provide a signal processing device in which prepared parameter sets can respectively be arranged at a plurality of operating positions within a predetermined operating range of a control knob using a small number of control knobs. Further, it is a second object of the present invention to provide a signal processing device in which only a part of main parameter(s) of the parameter set can be set independently of selection of each parameter set.

In order to achieve the above-mentioned objects, there is provided a signal processing device for subjecting an input signal to signal processing using one set of parameters, the signal processing device comprising: a parameter memory that stores therein a plurality of sets of prepared parameters; a first control knob that can be moved over a predetermined operating range, each of the plurality of sets of prepared parameters being respectively assigned to each of the plurality of predetermined positions defined in the predetermined operating range; a read-out section that reads out two sets of prepared parameters, assigned to two positions adjacent to a current operating position of the first control knob, from the parameter memory; and an interpolation section that interpolates the two sets of prepared parameters in accordance with the current operating position of the first control knob to obtain one set of interpolated parameters, wherein the input signal is subjected to the signal processing using the one set of interpolated parameters.

According to the present invention, the plural sets of prepared parameters (in an embodiment, referred to as "sweet spot data") are respectively assigned to each of the plurality of predetermined positions within the predetermined operating range of the one first control knob. The user is allowed to set desired parameters consistent with an object of the signal processing easily by setting the first control knob to one position of the plurality of predetermined positions to which a desired set is assigned. In addition, when the current operating position of the first control knob is positioned between any two adjacent positions of the plurality of predetermined positions, the two sets of prepared parameters read out from the parameter memory in correspondence to the two adjacent positions are interpolated in accordance with the current operating position of the first control knob. Thus, although the signal processing device of the present invention has a simple configuration, a variety of parameter sets can be selected and realized easily in accordance with the continuous operating position in the predetermined operating range of the first control knob.

In the signal processing device of the present invention, it is preferable that the signal processing device further includes: a second control knob; an offset value generating section that generates two or more offset values corresponding to two or more parameters in the one set of interpolated parameters in accordance with a current operating position of the second control knob; and a parameter modifying section that respectively modifies values of the two or more parameters in the one set of interpolated parameters in accordance with the corresponding offset values to obtain one set of modified parameters, wherein the input signal is subjected to the signal processing using the one set modified parameters.

According to the present invention, the one set of interpolated parameters (basic parameters) is determined on the basis of the operating position of the first control knob, and the two or more parameters in the one set of interpolated parameters (basic parameters) can be worked together and modified (or changed) when the second control knob is operated. Thus, parameter sets according to the objects can be arranged to the plurality of predetermined positions of the first control knob. The main parameter(s) can be adjusted by means of the second control knob independently of selection of the parameter set. Parameter setup can be wholly carried out easy-to-understand and with good operability using a small number of control knobs. Further, flexibility to set the parameters to the respective operating positions in the predetermined operating range of the first control knob can be improved while using only a small number of control knobs.

BRIEF DESCRIPTION OF DRAWINGS

The foregoing and other objects, features and advantages of the present invention will become more readily apparent from the following detailed description of preferred embodiments of the present invention that proceeds with reference to the appending drawings, in which.

DETAILED DESCRIPTION

Embodiments of the present invention will now be described with reference to the accompanying drawings.

1. Hardware Configuration of Embodiment

Figure 1:
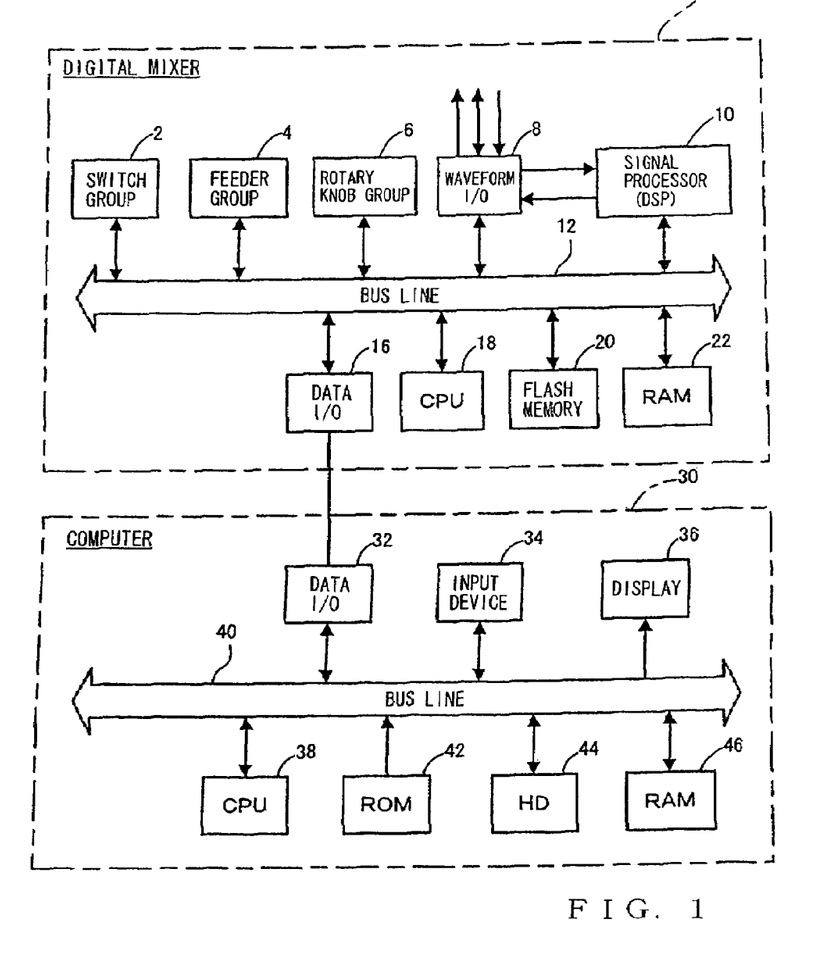
FIG. 1 is a block diagram showing a hardware configuration of an embodiment of the present invention.

First, a hardware configuration according to an embodiment of the present invention will be described with reference to FIG. 1. The hardware configuration of the present embodiment includes a digital mixer 1 and a computer 30.

In the inside of the digital mixer 1, a reference numeral 2 denotes a switch group, and the switch group 2 is constructed from various switches. A reference numeral 4 denotes a feeder group, and the feeder group 4 is constructed from a plurality of feeders for adjusting signal levels of respective input/output channels. A reference numeral 6 denotes a rotary knob group, and the rotary knob group 6 is constructed from a plurality of rotary knobs for setting parameters and the like of compressors of the respective input/output channels. A reference numeral 8 denotes a waveform I/O section, and the waveform I/O section 8 inputs and outputs an analog audio signal to and from an external apparatus. In the present embodiment, all of a mixing process, an effect process and the like for various audio signals are executed as a digital process. However, since both of an audio signal to be inputted from the outside and an audio signal to be outputted to the outside are analog signals, the waveform I/O section 8 executes the conversion (that is, A/D conversion and D/A conversion).

A reference numeral 10 denotes a signal processor, and the signal processor 10 is constructed from a group of DSPs (digital signal processor). The signal processor 10 subjects a digital audio signal supplied via the waveform I/O section 8 to a mixing process or an effect process, and outputs the result (processed digital audio signal) to the waveform I/O section 8. A reference numeral 16 denotes a data I/O section, and the data I/O section 16 is connected to a personal computer 30 or the like to input and output various data to and from the personal computer 30. A reference numeral 18 denotes a CPU, and the CPU 18 controls each component of the digital mixer 1 on the basis of a control program (will be described later) via a bus line 12. A reference numeral 20 denotes a flash memory, and the control program is stored in a program area of the flash memory 20. A reference numeral 22 denotes a RAM, and the RAM 22 is used as a work memory of the CPU 18.

Next, in the inside of the personal computer 30, a reference numeral 32 denotes a data I/O section, and the data I/O section 32 executes various data communication with the data I/O section 16 in the digital mixer 1. A reference numeral 34 denotes an input device, and the input device 34 is constructed from a keyboard for input of characters, mouse and the like. A reference numeral 36 denotes a display, and various kinds of information are displayed on the display 36 for a user. A reference numeral 38 denotes a CPU, and the CPU 38 controls other components on the basis of a program (will be described later) via a bus line 40. A reference numeral 42 denotes a ROM, and an initial program loader and the like are stored in the ROM 42. A reference numeral 44 denotes a hard disk, and an operating system, various application programs, waveform data and the like are stored in the hard disk 44. A reference numeral 46 denotes a RAM, and the RAM 46 is used as a work memory of the CPU 38.

2. Panel Configuration

Next, the external appearance of a main part of an operation panel in the digital mixer 1 will be described with reference to FIG. 2.

Figure 2:
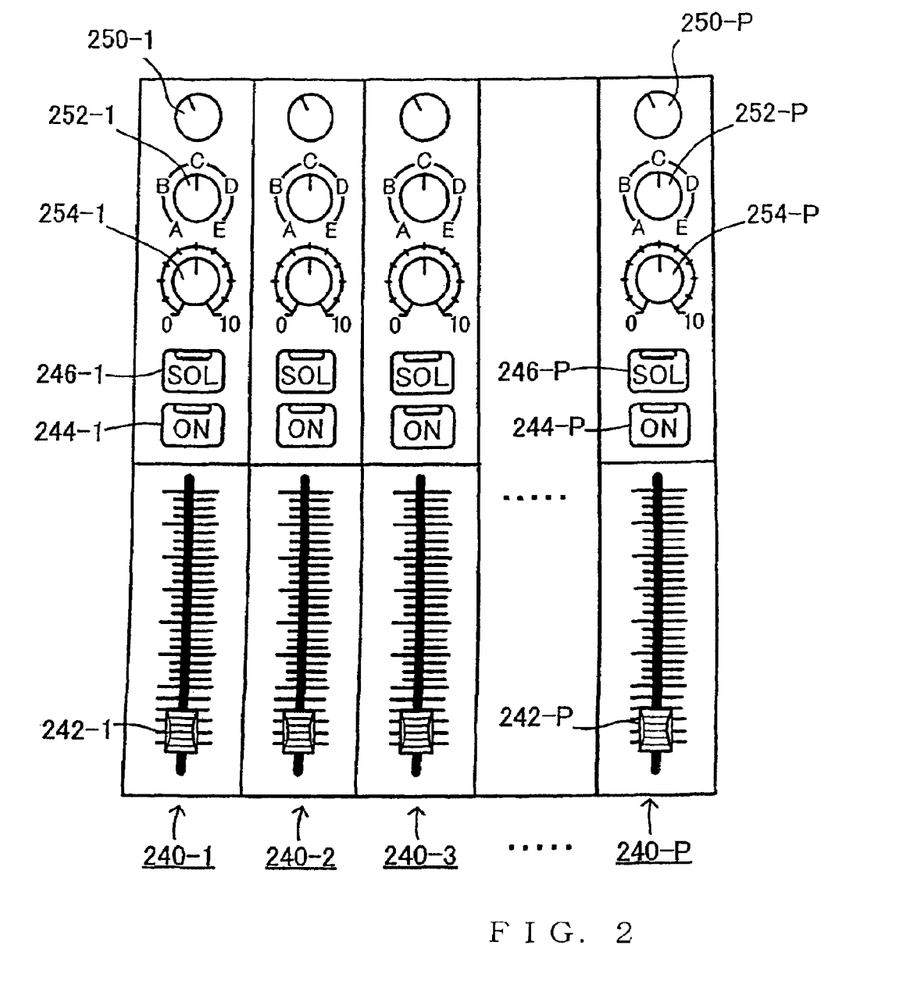
FIG. 2 is a plan view of a main part of an operation panel in a digital mixer.

In FIG. 2, reference numerals 240-1 to 240-P denote channel strips, and the channel strips 240-1 to 240-P are assigned to the respective input/output channels. In the inside of the channel strip 240-1, a reference numeral 242-1 denotes a feeder, and the feeder 242-1 is used to adjust the volume of the corresponding input/output channel. A reference numeral 244-1 denotes an on/off key, and the on/off key 244-1 is used to set an on/off state of audio output of the corresponding input/output channel. A reference numeral 246-1 denotes a solo key, and the solo key 246-1 is used to switch whether or not the audio signal of the corresponding input/output channel is supplied to a circuit for a monitor of an operator.

A reference numeral 250-1 denotes a PAN knob, and the PAN knob 250-1 is used to adjust volume balance between right and left stereo channels of the audio signal according to the channel strip 240-1. A reference numeral 252-1 denotes a first rotary knob, and a reference numeral 254-1 denotes a second rotary knob. Parameters of the compressor processing are determined by means of the first and second rotary knobs 252-1, 254-1. Further, a feeder, an on/off key, a solo key, a PAN knob, and first and second rotary knobs are provided for each of the other channel strips in the same manner as the channel strip 240-1.

On the periphery of the first rotary knob 252-1, characters "A, B, C, D and E" are respectively stamped at positions obtained by equally dividing the periphery into "5". A parameter group, called "sweet spot data", is associated with an operating position according to each of these characters. Each of these "5" operating positions is referred to as a "sweet spot position". The sweet spot data mean a parameter group composed of plural kinds (n) of parameters each having a value determined in advance on the assumption that the parameters are used for specific compressor processing. One into which the "5" sets of sweet spot data A, B, C, D and E are integrated is called a "sweet spot data group". In this regard, details of the parameters used for the compressor processing will be described later.

Figure 3:
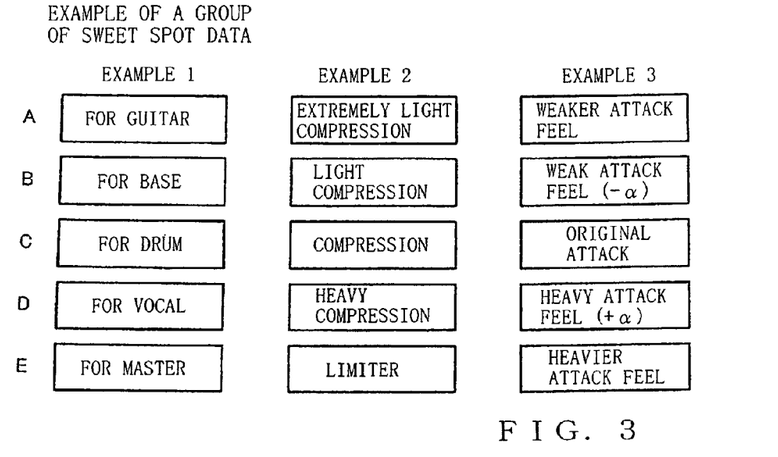
FIG. 3 is a view showing various examples of a sweet spot data group.

Next, various examples of the sweet spot data group are shown in FIG. 3. In Example 1 of FIG. 3, as the 5 sets of sweet spot data A, B, C, D and E corresponding to the respective sweet spot positions in which the periphery of the rotary knob is divided into 5, a parameter group including "for guitar", "for base", "for drum", "for vocal", and "for master" is prepared in advance, and the components are assigned into the respective sweet spot positions. On the other hand, in Example 2, a sweet spot data group is constructed by focusing intensity of compression (amplitude of a compression ratio) in a dynamic range of the compressor processing. In this Example 2, the 5 sets of sweet spot data A, B, C, D and E correspond to typical compression contents of 5 types of different compression ratios including "extremely light compression", "light compression", "compression", "heavy compression", and "limiter". The typical compression contents are assigned to the respective sweet spot positions so that the compression ratio becomes larger in turn in accordance with an arrangement sequence of the respective sweet spot positions. This is because the compression ratio can be sequentially controlled in response to continuous rotation over the overall operating position range of the one rotary knob (252-1).

Further, in Example 3, the sweet spot data group is constructed by focusing intensity of an attack feel (amplitude of peak at rising time). In this Example, the 5 sets of sweet spot data A, B, C, D and E correspond to typical compression contents of 5 types of different attack feels including "weaker attack feel", "weak attack feel $(-\alpha)$", "original attack feel", "heavy attack feel $(+\alpha)$", and "heavier attack feel". The typical compression contents are assigned to the respective sweet spot positions so that the attack feel becomes larger in turn in accordance with an arrangement sequence of the respective sweet spot positions. This is also because the attack feel can be sequentially controlled in response to continuous rotation over the overall operating position range of the one rotary knob (252-1). As mentioned in Examples 1 to 3, each of the sweet spot data A, B, C, D and E is applied to meaning with a predetermined rule. A unique ID is applied to each of these data in the sweet spot data group. The IDs are also stored in the flash memory 20 of the digital mixer 1 in addition to any "one" set of sweet spot data group.

3. Algorithm Configuration of Process Relating to the Compressor

Figure 4:
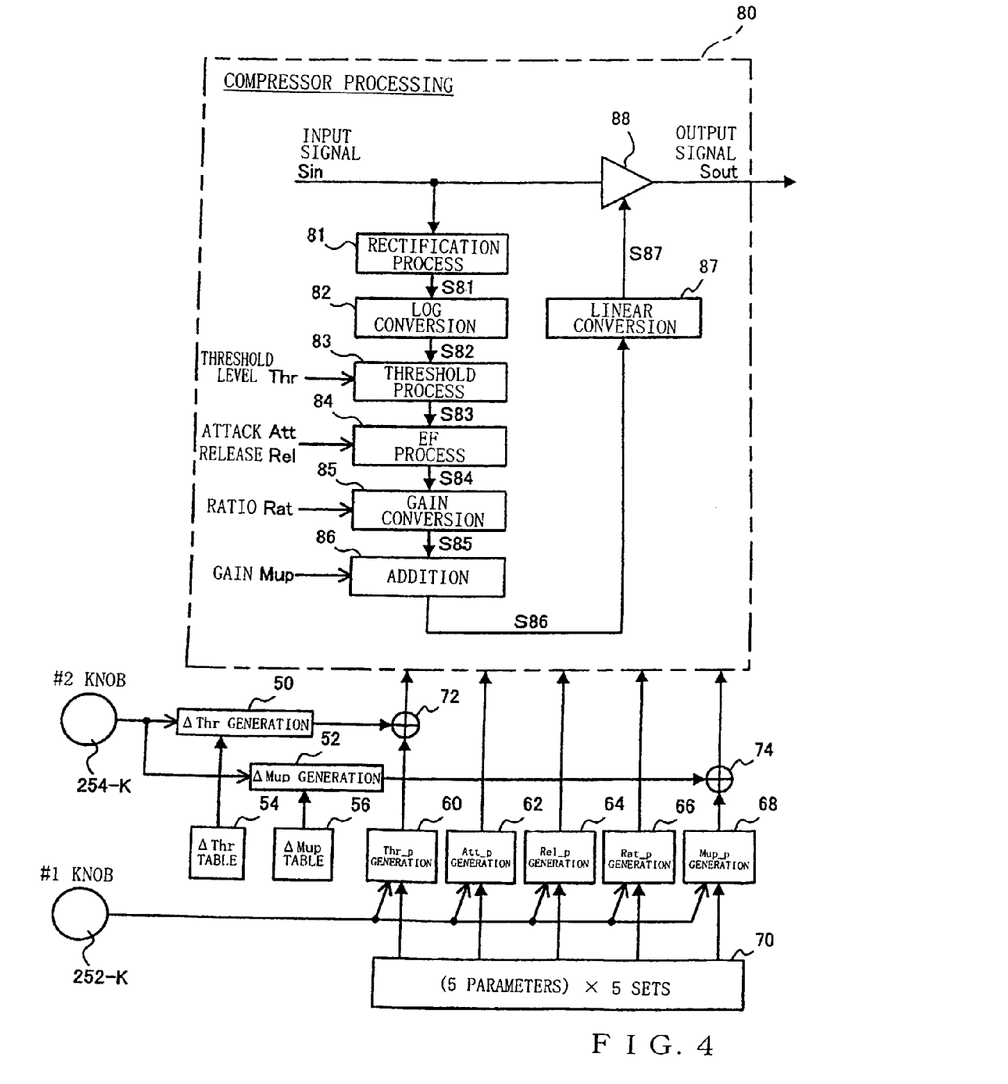
FIG. 4 is a block diagram of algorithm of compressor processing executed in a signal processor.

In the signal processor 10 and the like, processes such as a mixing process and an effect process are executed against the respective input/output channels. Algorithm of the compressor processing to be executed as one of these processes and algorithm of a process of the CPU 18 corresponding to the compressor processing will be described with reference to FIG. 4. In this regard, the algorithm of the compressor processing is achieved by a program set to the signal processor 10. The program is loaded into the signal processor 10 from the flash memory 20 or the like under control of the CPU 18. In FIG. 4, a portion of a reference numeral 80 denotes the compressor processing that the signal processor 10 executes, and a remaining portion is achieved by executing a process shown in a flowchart of FIG. 6 (will be described later in detail) by means of the CPU 18. In the compressor processing 80, plural kinds of parameters such as a threshold value Thr, attack time Att, release time Rel, a ratio Rat and gain Mup are used. Each of the values of these various parameters is arbitrarily set so as to be variable, and an input signal Sin is subjected to the compressor processing (a process to compress a dynamic range of the input signal Sin) on the basis of the values of the plural kinds of parameters thus set. As a result, an output signal Sout obtained by compressing the dynamic range of the input signal Sin is outputted.

In the inside of the compressor processing 80, a reference numeral 81 denotes a rectification processing section. The input signal Sin (an audio signal that is a target of the compressor processing), which is expressed by a linear scale, is rectified, and the rectified result is outputted as a rectified signal S81. A reference numeral 82 denotes a log converting section. The rectified signal S81 is subjected to logarithmic arithmetic, and the subjected result is converted to a signal S82 with a decibel scale to be outputted. A reference numeral 83 denotes a threshold value processing section. When a level of the signal S82 expressed with the decibel scale is less than the threshold value Thr, a value "0" a is outputted. When the level of the signal S82 is the threshold value Thr or more, a signal S83 of "S82-Thr" (a difference between the level of the signal S82 and the threshold value Thr) is outputted. Here, the threshold value Thr means a level of a decibel scale at which compression against the input signal Sin is started. Namely, when the level (decibel) of the input signal Sin becomes the threshold value Thr or more and the signal S82 becomes the threshold value Thr or more, the compression against the input signal Sin is started. Further, when the level (decibel) of the input signal Sin becomes less than the threshold value Thr and the signal S82 continuously becomes less than the threshold value Thr, the compression against the input signal Sin is released. In other words, an input signal Sin having a level of the threshold value Thr or more is to be subjected to the compressor process.

Next, a reference numeral 84 denotes an envelope follower processing section. The envelope follower processing section 84 generates an envelope signal of the signal S83, and subjects the envelope signal to a deformation process on the basis of the attack time Att and the release time Rel to output the subjected result as a signal S84. Here, the attack time Att is a parameter to set following speed when the envelope signal is increased so as to follow the signal S83 in the case where the signal S83 is larger than the envelope signal. Further, the release time Rel is a parameter to set following speed when the envelope signal is decreased so as to follow the signal S83 in the case where the signal S83 is smaller than the envelope signal. Since the attack time Att and the release time Rel are the parameters to be set as time constants, they are applied to names of " . . . time".

A reference numeral 85 denotes a gain converting section, and the gain converting section 85 converts the signal S84 into a gain signal S85 on the basis of the ratio Rat. Here, the ratio Rat is a parameter to set the compression ratio when the input signal Sin is compressed in the case where the input signal Sin becomes a threshold value Thr_lin or more. A reference numeral 86 denotes an addition section. The addition section 86 adds the gain Mup with the decibel scale to be applied to the input signal Sin to the gain signal S85, and outputs the added result as a gain signal S86. A reference numeral 87 denotes a linear converting section, and the linear converting section 87 converts the gain signal S86 into a gain signal S87 with a linear scale by subjecting the gain signal S86 with the decibel scale to exponential arithmetic. A reference numeral 88 denotes a multiplication section. The multiplication section 88 multiplies the gain signal S87 by the input signal Sin, and outputs the multiplied result as the output signal Sout.

A reference numeral 70 denotes a parameter memory. In the parameter memory 70, the 5 sets of sweet spot data A, B, C, D and E corresponding to the 5 operating positions (A, B, C, D and E) are stored for each of first rotary knobs 252-K (where "K" is any integer from 1 to P; that is, a reference numeral "252-K" denotes any one knob among a plurality of first rotary knobs 252-1 to 252-P). These sweet spot data are stored in the flash memory 20, and they are transferred to the parameter memory 70 from the flash memory 20 under control of the CPU 18. Each of the 5 sets of sweet spot data is composed of a set of the plural kinds (n) of parameters Thr, Att, Rel, Rat, Mup described above each having a value determined in advance. Hereinafter, concrete values of the plural kinds (n) of parameters Thr, Att, Rel, Rat, Mup constituting each set of sweet spot data are respectively indicated as reference numerals Thr_S, Att_S, Rel_S, Rat_S, Mup_S.

Here, a current operating position of the first rotary knob 252-K may just correspond with any one of the sweet spot positions (A, B, C, D and E), or may be set to an appropriate position between any two of the sweet spot positions. The current operating position of the first rotary knob 252-K may generally be considered to be set to a position between two adjacent sweet spot positions of the 5 sweet spot positions (A, B, C, D and E). In the case where the current operating position of the first rotary knob 252-K is set to a position between the two adjacent sweet spot positions of the 5 sweet spot positions (A, B, C, D and E), values of each parameter of the same kind in the two sets of sweet spot data corresponding to the two adjacent sweet spot positions are interpolated in accordance with the current operating position of the first rotary knob 252-K whereby the respective values of the plural kinds (n) of parameters Thr, Att, Rel, Rat, Mup corresponding to the current operating position are obtained. For that reason, the two sets of sweet spot data associated with the two adjacent sweet spot positions are read out from the parameter memory 70.

On the other hand, in the case where the current operating position of the first rotary knob 252-K just corresponds with any one of the 5 sweet spot positions (A, B, C, D and E), there is no need to execute interpolation arithmetic as described above, and only one set of sweet spot data associated with the one sweet spot position corresponding to the current operating position may be read out from the parameter memory 70. However, the present invention is not limited thereto. Even in the case where the current operating position of the first rotary knob 252-K just corresponds with any one of the 5 sweet spot positions (A, B, C, D and E), the respective values of the plural kinds of parameters Thr, Att, Rel, Rat, Mup corresponding to the current operating position may be obtained by executing the interpolation arithmetic in the same manner. In such a case, one interpolation coefficient of the two sets of sweet spot data may be set to "1" and the other may be set to "0". Thus, the interpolated result is equivalent to the case where any one set of sweet spot data corresponding to the one sweet spot position that corresponds with the current operating position of the first rotary knob 252-K is used as it is.

A reference numeral 60 denotes a threshold value generating section, a reference numeral 62 denotes an attack rate generating section, a reference numeral 64 denotes a release rate generating section, a reference numeral 66 denotes a ratio generating section, and a reference numeral 68 denotes a gain generating section. They are used to subject each of the plural kinds of parameters Thr, Att, Rel, Rat, Mup to interpolation arithmetic. Namely, each of the generating sections 60, 62, 64, 66, and 68 linearly interpolates each of parameter values Thr_S, Att_S, Rel_S, Rat_S, Mup_S in the above two sets of sweet spot data for every corresponding kind of parameter in accordance with the current operating position of the first rotary knob 252-K (the operating position between the above two adjacent sweet spot positions), and outputs the interpolated result as a set of basic parameters Thr_p, Att_p, Rel_p, Rat_p, Mup_p. The attack time Att_p, the release time Rel_p, and the ratio Rat_p in these parameters are directly supplied to the compressor processing 80 described above as the attack time Att, the release time Rel and the ratio Rat in the compressor processing 80.

However, the threshold value Thr_p and the gain Mup_p are increased or decreased in accordance with the amount of operation of the second rotary knob 254-K and then, they are supplied to the compressor processing 80 as the threshold value Thr and the gain Mup described above. Here, a difference between the threshold value Thr_p outputted from the threshold value generating section 60 and the threshold value Thr to be supplied to the compressor processing 80 is referred to as a threshold value difference ΔThr, and a difference between the gain Mup_p outputted from the gain generating section 68 and the gain Mup to be supplied to the compressor processing 80 is referred to as a gain difference ΔMup.

A reference numeral 54 denotes a ΔThr table, and a reference numeral 56 denotes a ΔMup table. The threshold value difference ΔThr and the gain difference ΔMup corresponding to the amount of operation of the second rotary knob 254-K are stored in the ΔThr table and the ΔMup table, respectively. A reference numeral 50 denotes a ΔThr generating section, and a reference numeral 52 denotes a ΔMup generating section. The ΔThr generating section 50 and the ΔMup generating section 52 respectively read out the ΔThr table 54 and the ΔMup table 56 on the basis of the amount of operation of the second rotary knob 254-K to output the threshold value difference ΔThr and the gain difference ΔMup. Reference numerals 72, 74 denote addition sections. The addition sections 72, 74 respectively add the threshold value difference ΔThr and the gain difference ΔMup to the threshold value Thr_p and the gain Mup_p, and output the addition results to the compressor processing 80 as the threshold value Thr and the gain Mup.

Figure 5A:
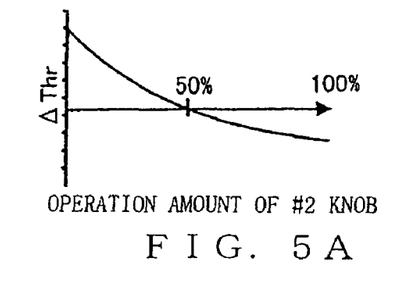
FIGS. 5A and 5B are views each showing one example of a characteristic of each of a threshold value difference ΔThr and a gain difference ΔMup.
Figure 5B:
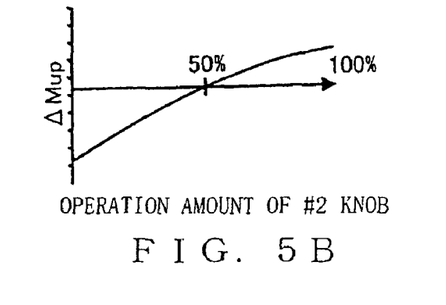

Here, one example of a characteristic of each of the threshold value difference ΔThr and the gain difference ΔMup in the ΔThr table 54 and the ΔMup table 56 is shown in each of FIGS. 5A, 5B. As shown in FIG. 5A, the threshold value difference ΔThr has a characteristic of downward-sloping curve. Thus, the more the second rotary knob 254-K is tuned to the right, the lower the threshold value Thr becomes. On the other hand, as shown in FIG. 5B, the gain difference ΔMup has a characteristic of upward-sloping curve. Thus, the more the second rotary knob 254-K is tuned to the right, the higher the gain Mup becomes. On the condition that the threshold value Thr is lowered, volume of the whole audio signal tends to be lowered with respect to audibility because a wide range in the dynamic range of the audio signal is compressed.

Thus, in the present embodiment in the case where the threshold value Thr is lowered, the gain Mup is to be raised, whereby substantially constant volume is obtained with respect to audibility regardless of the amount of operation of the second rotary knob 254-K. Further, both the threshold value difference ΔThr and the gain difference ΔMup become "0" when the amount of operation of the second rotary knob 254-K is "50%" (center position). Therefore, at this condition, the gain Mup corresponds with the gain Mup_p, and the threshold value Thr corresponds with the threshold value Thr_p. Hereinafter, the parameters Thr, Att, Rel, Rat, Mup to be supplied to the compressor processing 80 are referred to as a "set of synthesis parameters".

4. Knob Operation Event Process in Digital Mixer 1

Figure 6A:
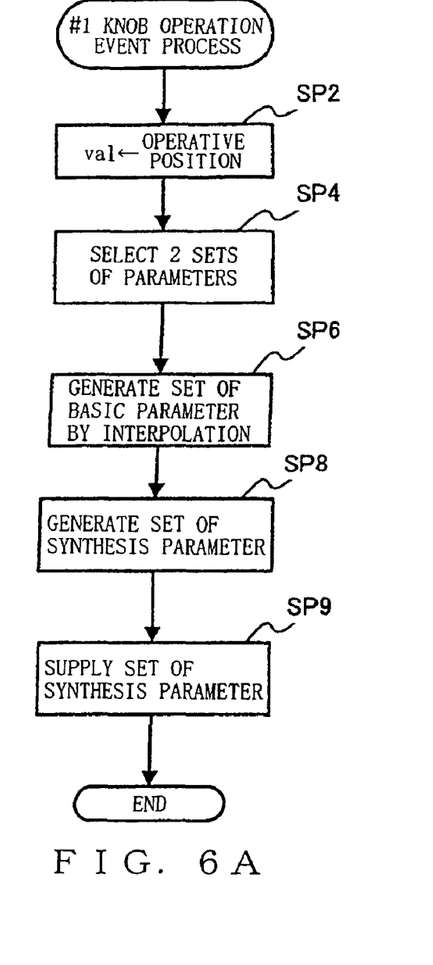
FIGS. 6A and 6B are flowcharts of a knob operation event process routine in a digital mixer.

Next, an operation of the digital mixer 1 when the first or second rotary knob is operated will be described with reference to FIGS. 6A, 6B. Here, flowcharts in FIGS. 6A, 6B correspond to the blocks 50 to 74 of FIG. 4. When the first rotary knob 252-K is first operated by the user, a first rotary knob operation event process routine shown in FIG. 6A is started. When the processing flow proceeds to Step SP2 in FIG. 6A, the current operating position (or operative position) of the first rotary knob 252-K is assigned to a variable val.

Next, when the processing flow proceeds to Step SP4, two sets of sweet spot data corresponding to two sweet spot operating positions between which the current operating position val is sandwiched are selected from the sweet spot data group stored in a predetermined area of the parameter memory 70 in the flash memory 20. Next, when the processing flow proceeds to Step SP6, an interpolation ratio of the two sets of sweet spot data thus selected is determined on the basis of a position of the operating position val between the two sweet spot operating positions, and the respective parameters of the two sets of sweet spot data are interpolated on the basis of the interpolation ratio, whereby one set of basic parameters Thr_p, Att_p, Rel_p, Rat_p, Mup_p is generated. Next, when the processing flow proceeds to Step SP8, the threshold value difference ΔThr and the gain difference ΔMup according to the operating position of the second rotary knob 254-K are respectively added to the threshold value Thr_p and the gain Mup_p among the set of basic parameters Thr_p, Att_p, Rel_p, Rat_p, Mup_p thus generated, whereby a set of synthesis parameters Thr (=Thr_p+ΔThr), Att (=Att_p), Rel (=Rel_p), Rat (=Rat_p), Mup (=Mup_p+ΔMup) is generated. Next, when the processing flow proceeds to Step SP9, the set of synthesis parameters is supplied to the compressor processing 80 of the signal processor 10. Thus, in the compressor processing 80, the compressing process for the audio signal is continued on the basis of a new set of synthesis parameters thus supplied.

Figure 6B:
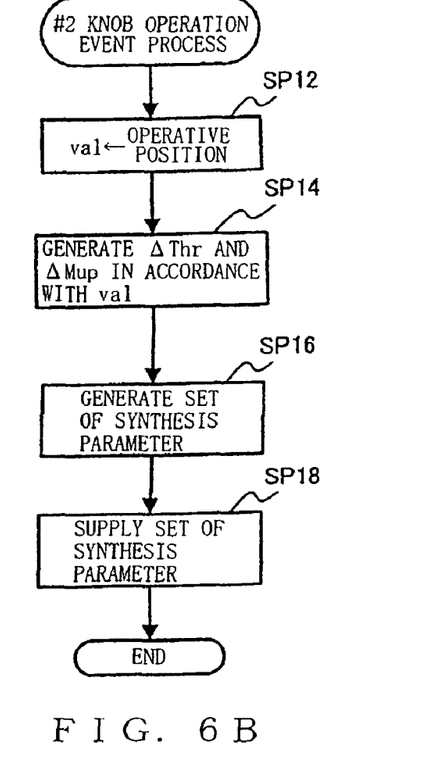

Further, when the second rotary knob 254-K is operated by the user, a second rotary knob operation event process routine shown in FIG. 6B is started. When the processing flow proceeds to Step SP12 in FIG. 6B, a current operating position of the second rotary knob 254-K is assigned to the variable val. Next, when the processing flow proceeds to Step SP14, the ΔThr table 54 and the ΔMup table 56 stored in the flash memory 20 are referred to in accordance with the operating position val and the threshold value difference ΔThr and the gain difference ΔMup are determined. Next, when the processing flow proceeds to Step SP16, in the same manner as the process at Step SP8 described above, the threshold value difference ΔThr and the gain difference ΔMup thus determined are respectively added to the threshold value Thr_p and the gain Mup_p among the set of basic parameters Thr_p, Att_p, Rel_p, Rat_p, Mup_p in accordance with the operating position of the first rotary knob 252-K at that time, whereby a set of synthesis parameters Thr (=Thr_p+ΔThr), Att (=Att_p), Rel (=Rel_p), Rat (=Rat_p), Mup (=Mup_p+ΔMup) is generated. Next, when the processing flow proceeds to Step SP18, in the same manner as the process at Step SP9 described above, the set of synthesis parameters thus generated is supplied to the compressor processing 80 of the signal processor 10. Thus, in the compressor processing 80, the compressing process for the audio signal is continued on the basis of a new set of synthesis parameters thus supplied.

5. Operation in Personal Computer 30

5.1. Startup of Sweet Spot Data Downloader

Figure 7A:
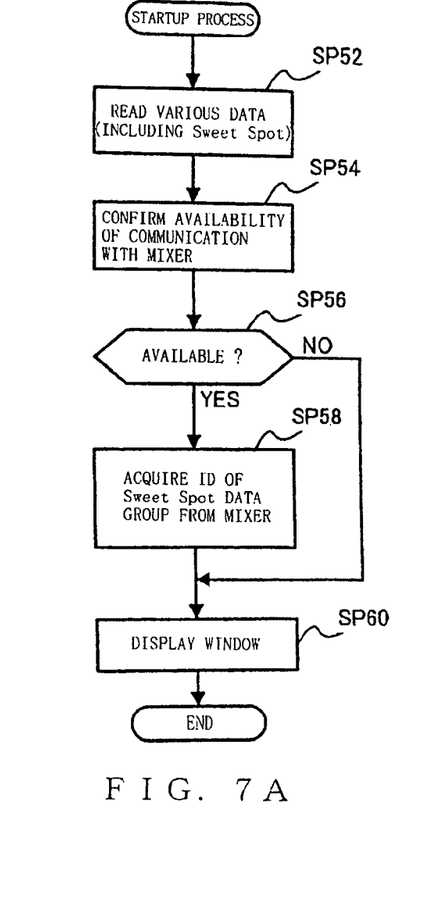
FIGS. 7A and 7B are flowcharts of various process routines in a personal computer and the digital mixer.

Next, an operation of the personal computer 30 will be described with reference to FIGS. 7A, 7B. When a predetermined operation is carried out in the personal computer 30, a startup process routine of the application program, which is called a sweet spot data downloader, shown in FIG. 7A is executed. When the processing flow proceeds to Step SP52 in FIG. 7A, various necessary data are read out from the hard disk 44. A plurality of sweet spot data groups are included in these data.

Figure 8:
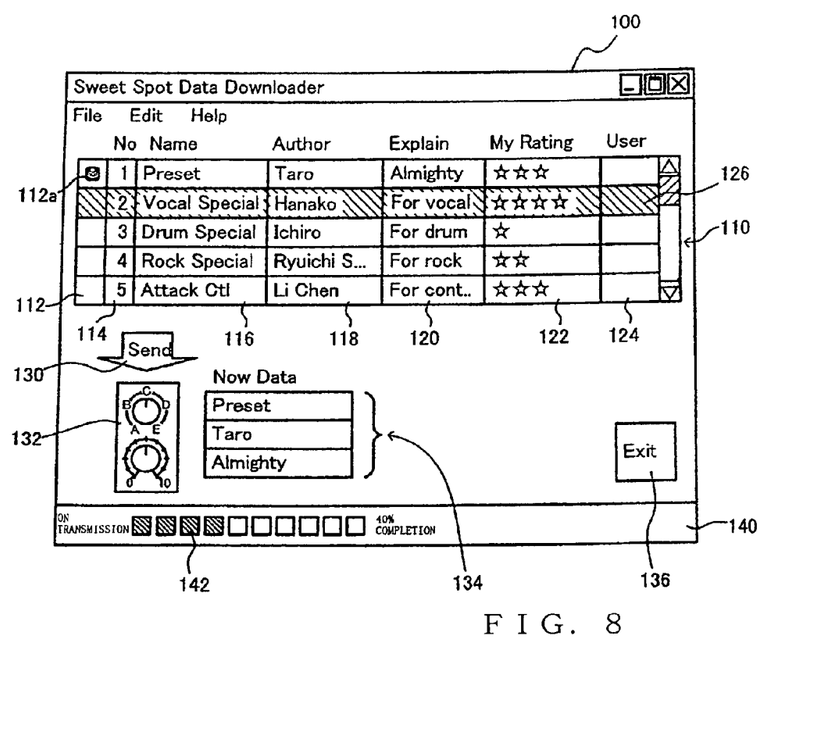
FIG. 8 is a view showing a display example of an application window.

Next, when the processing flow proceeds to Step SP54, it is determined whether or not communication with the digital mixer 1 can be executed via the data I/O section 32. In the case where it is determined at Step SP56 that the communication can be executed, the processing flow proceeds to Step SP58, and an ID of the sweet spot data group that has already been stored in the digital mixer 1 is acquired. Next, when the processing flow proceeds to Step SP60, the application window 100 shown in FIG. 8 is displayed on the display 36.

In the inside of the application window 100, a reference numeral 110 denotes a data list, and the data list 110 is constructed from a plurality of "lines" that correspond to the respective sweet spot data groups. Any line in the data list 110 constitutes a cursor line. In the example shown in FIG. 8, a cursor is displayed with hatching of the background, and a line 126 becomes the cursor line at this time. In each line, a reference numeral 112 denotes a current data display section. In the case where there is a line associated with the sweet spot data group currently loaded in the digital mixer 1, an icon 112a is displayed in the line.

A reference numeral 114 denotes an ID display section, and an ID of each of the sweet spot data groups is displayed in the ID display section 114. A reference numeral 116 denotes a name display section, a reference numeral 118 denotes an author's name display section, and a reference numeral 120 denotes an explanation section. A name, an author's name and a brief explanatory note that correspond to the sweet spot data group are respectively displayed in the name display section 116, the author's name display section 118 and the explanation section 120. A reference numeral 122 denotes a rating display section. For example, rating based on the degree of importance and the like defined by the user is displayed in the rating display section 122 by means of the number of stars. A reference numeral 124 denotes a user section, and character strings such as a comment specified by the user are displayed in the user section 124.

As described above, the data displayed in each line of the data list 110 are stored in the hard disk 44 as a database so as to be associated with the corresponding sweet spot data group. The contents of this database are read out, whereby the application window 100 as shown in FIG. 8 is displayed. Further, application of meaning (for example, a character string shown in FIG. 3) of each of the sweet spot data A, B, C, D and E included in each of the sweet spot data groups is stored in this database. These character strings are not displayed in the data list 110 at a normal state, but a pop-up window is displayed when an explanation section 120 in any line is right-clicked with the mouse. A character string of application of meaning of the corresponding sweet spot data A, B, C, D and E is displayed in this pop-up window.

A reference numeral 130 denotes a send button. When the send button 130 is clicked with a mouse, the sweet spot data group in the cursor line 126 is transferred to the digital mixer 1. In this regard, details of the process will be described later. A reference numeral 132 denotes a rotary knob image section. Images modeled on the first and second rotary knobs in the digital mixer 1 are displayed in the rotary knob image section 132. A reference numeral 134 denotes a current data content display section. The name, the author's name and the explanation of the sweet spot data group currently loaded in the digital mixer 1 are displayed in the current data content display section 134. The contents displayed herein become the same as the contents displayed in the name display section 116, the author's name display section 118 and the explanation section 120 of the line (in the example of FIG. 8, a first line) on which the icon 112a is positioned in the data list 110.

The rotary knob image section 132 and the current data content display section 134 are displayed at a normal state when the digital mixer 1 and the personal computer 30 are in a communicable state. On the other hand, they are displayed with grayout when they are in an incommunicable state. A status bar 140 is formed at the lower portion of the application window 100. In the case where the sweet spot data group is being transmitted to the digital mixer 1 (that is, on transmission), a progress bar 142 that indicates progress in the transmission is displayed in the status bar 140. A reference numeral 136 denotes an EXIT button. When the EXIT button 136 is clicked with the mouse, the application window 100 is closed.

5.2. Send Button on Event Process

Next, a process of the case where the send button 130 is pressed will be described with reference to FIG. 7B.

Figure 7B:
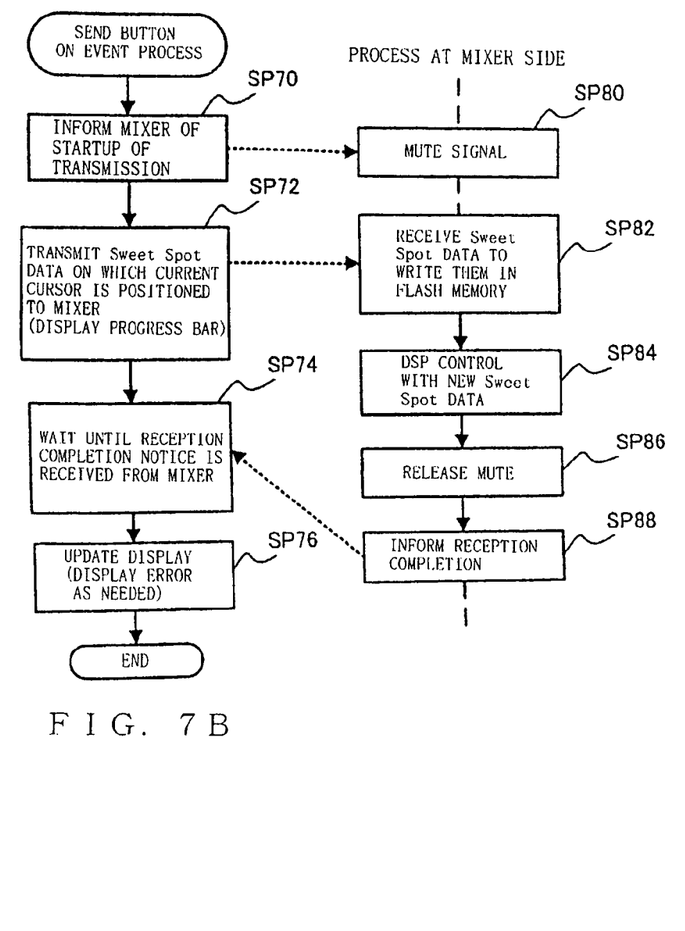

When the send button 130 is first pressed in the digital mixer 1, a send button on event process routine shown in FIG. 7B is started. When the processing flow proceeds to Step SP70 in FIG. 7B, a message that transmission of the sweet spot data group is started is transmitted to the digital mixer 1 from the personal computer 30. On the other hand, in the digital mixer 1, the process at Step SP80 is executed, and all of the audio signals that are being outputted currently are muted.

Next, in the personal computer 30, when the processing flow proceeds to Step SP72, the sweet spot data group corresponding to the cursor line is transmitted to the digital mixer 1. At this time, as described above, the progress bar 142 is displayed in the status bar 140. Next, when the processing flow proceeds to Step SP74, the processing flow waits, with limits of predetermined limit time, until a reception completion notice that reception of the sweet spot data group is completed is supplied from the digital mixer 1.

On the other hand, in the digital mixer 1, when the sweet spot data group is received, the processing flow proceeds to Step SP82, and the sweet spot data group is written in the flash memory 20. Next, when the processing flow proceeds to Step SP84, this sweet spot data group is written in the parameter memory 70 of the signal processor 10. Thus, a compressing process of audio signals is started on the basis of this new sweet spot data group. Next, when the processing flow proceeds to Step SP86, the mute of the respective audio signals is released. Thus, sound production of the audio signals is restarted. Next, when the processing flow proceeds to Step SP88, the reception completion notice is transmitted to the personal computer 30.

When the reception completion notice is received in the personal computer 30, the processing flow proceeds to Step SP76, and the display contents of the application window 100 are updated. Namely, in the current data display section 112, the icon 112a is moved to the line corresponding to the transmitted sweet spot data group, and the contents of the current data content display section 134 are also changed into the contents of the transmitted sweet spot data group. However, at Step SP74 described above, even in the case where the reception completion notice is not supplied when the above limit time elapses, the processing flow proceeds to Step SP76. In this case, an error message that the sweet spot data group is not normally transmitted is displayed on the display 36, but the display contents of the application window 100 are not updated.

6. Alternative Examples

The present invention is not limited to the embodiment described above, and for example, various variations and changes can be applied to the present invention as follows.

(1) In the embodiment described above, the various processes are executed by means of the programs operating on the digital mixer 1 or the personal computer 30. However, only these programs may be stored in a recording medium such as a CD-ROM or a memory card to be distributed. Alternatively, these programs may be distributed through a transmission line.

(2) In the embodiment described above, the compressor processing function is embedded in the digital mixer 1. However, the compressor processing function may be embedded in an analog mixer or a recorder, or the compressor processing function may be realized in a single compressor. Further, in the embodiment described above, the digital mixer 1 inputs and outputs an analog audio signal from and to the outside. However, a digital audio signal may be inputted and outputted to and from the digital mixer 1.

(3) In the embodiment described above, the characteristic of each of the threshold value difference ΔThr and the gain difference ΔMup is fixedly defined as shown in FIGS. 5A, 5B. However, these characteristics may be downloaded from the personal computer 30 in addition to the sweet spot data group. Thus, more suitable characteristic of each of the threshold value difference ΔThr and the gain difference ΔMup can be applied to each of the sweet spot data groups.

(4) In the embodiment described above, the explanatory note of the corresponding sweet spot data group is displayed in the explanation section 120. However, the application of meaning (for example, the character string shown in FIG. 3) of each of the sweet spot data A, B, C, D and E may be displayed in the application window 100.

(5) Further, in the embodiment described above, a print-out function may be applied to the sweet spot data downloader, and a character string expressing "application of meaning" of each of the sweet spot data A, B, C, D and E included in each of the sweet spot data groups may be printed out on a medium such as a paper or a seal, whereby the medium can be attached (stuck) onto the panel of the digital mixer 1. Moreover, an indicator may be provided on the panel of the digital mixer 1. In this case, when data on the character string expressing the "application of meaning" are received from the application program, the character string may be displayed with text on the indicator.

(6) Furthermore, in the embodiment described above, in place of the first rotary knob 252-K and the second rotary knob 254-K, for example, a control (operator) for carrying out a linear slide operation such as a feeder control may be used. In short, any other control (operator) may be used so long as the control can output a continuous operating position val.

(7) The algorithm of the interpolation arithmetic is not limited to two-point interpolation that is executed using data on two adjacent sweet spot positions. The algorithm may be multipoint interpolation that is executed using data on three or more adjacent sweet spot positions.

The present invention can be constructed and implemented, not only as the device as discussed above, but also as a method. The present invention can also be implemented as a software program embedded in a computer-readable medium. Further, a dedicated processor with dedicated logic built in hardware, not to mention a computer or other general-purpose type processor capable of running a desired software program, can be used to implement the present invention.

Although the present invention has been particularly shown and described with reference to preferred embodiment thereof, it will be understood by those skilled in the art that the foregoing and other changes in form and details can be made therein without departing from the spirit and scope of the present invention. All modifications and equivalents attainable by one versed in the art from the present disclosure within the scope and spirit of the present invention are to be included as further embodiments of the present invention. The scope of the present invention accordingly is to be defined as set forth in the appended claims.

The present application is based on, and claims priority to, Japanese Patent Application No. 2007-004054 filed on 12 Jan. 2007. The disclosure of the priority application, in its entirety, including the drawings, claims, and the specification thereof, is incorporated herein by reference.

What is claimed is:

1. A signal processing device for subjecting an input signal to signal processing using one set of parameters, the signal processing device comprising:
a parameter memory that stores therein a plurality of sets of prepared parameters;
a first control knob that can be moved over a predetermined operating range, each of the plurality of sets of prepared parameters being respectively assigned to each of the plurality of predetermined positions defined in the predetermined operating range;
a read-out section that reads out two sets of prepared parameters, assigned to two positions adjacent to a current operating position of the first control knob, from the parameter memory; and
an interpolation section that interpolates the two sets of prepared parameters in accordance with the current operating position of the first control knob to obtain one set of interpolated parameters,
wherein the input signal is subjected to the signal processing using the one set of interpolated parameters.

2. The signal processing device as claimed in claim 1, further comprising:

a second control knob;
an offset value generating section that generates two or more offset values corresponding to two or more parameters in the one set of interpolated parameters in accordance with a current operating position of the second control knob; and
a parameter modifying section that respectively modifies values of the two or more parameters in the one set of interpolated parameters in accordance with the corresponding offset values to obtain one set of modified parameters,
wherein the input signal is subjected to the signal processing using the one set of modified parameters.

3. The signal processing device as claimed in claim 2, wherein the signal processing is a process for compressing a dynamic range of the input signal,
wherein the one set of parameters include:
a threshold value that defines a signal level at which compression of the input signal is started;
an attack time that controls how fast the compression is started if the input signal exceeds the signal level defined by the threshold value;
a release time that controls how fast the compression is ceased if the input signal falls below the signal level defined by the threshold value;
a compression ratio that controls degree of the compression of the input signal; and
a gain value that controls gain of the input signal, and
wherein the offset value generating section generates a first offset value corresponding to the threshold value and a second offset value corresponding to the gain value.

4. The signal processing device as claimed in claim 3, wherein the first offset value and the second offset value vary in inverse directions each other when the second control knob is operated in one direction.

5. The signal processing device as claimed in claim 1, further comprising a display that displays characters for describing each of the plurality of sets of prepared parameters, corresponding to each of the plurality of predetermined positions of the first control knob.

6. The signal processing device as claimed in claim 1, wherein the signal processing device is an audio mixer for mixing audio signals, and
wherein the audio mixer includes a plurality of channel strips, each of which comprises controls to be controlled by a human operator for controlling one of the audio signals to be mixed, and the first control knob is one of the controls of the channel strips.

7. The signal processing device as claimed in claim 2, wherein the signal processing device is an audio mixer for mixing audio signals, and
wherein the audio mixer includes a plurality of channel strips, each of which comprises controls to be controlled by a human operator for controlling one of the audio signals to be mixed, and the first and second control knobs are two of the controls of the channel strips.

8. A method of setting parameters in a signal processing device that subjects an input signal to signal processing using one set of parameters, the signal processing device including: a parameter memory that stores therein a plurality of sets of prepared parameters; and a first control knob that can be moved over a predetermined operating range, each of the plurality of sets of prepared parameters being respectively assigned to each of the plurality of predetermined positions defined in the predetermined operating range, the method comprising:

reading out two sets of prepared parameters, assigned to two positions adjacent to a current operating position of the first control knob, from the parameter memory; and interpolating the two sets of prepared parameters in accordance with the current operating position of the first control knob to obtain one set of interpolated parameters, wherein the input signal is subjected to the signal processing using the one set of interpolated parameters.

9. The method as claimed in claim 8, wherein the signal processing device further includes a second control knob, wherein the method further comprises:

generating two or more offset values corresponding to two or more parameters in the one set of interpolated parameters in accordance with a current operating position of the second control knob; and respectively modifying values of the two or more parameters in the one set of interpolated parameters in accordance with the corresponding offset values to obtain one set of modified parameter, and wherein the input signal is subjected to the signal processing using the one set modified parameters.

10. A computer program product embodied on a computer-readable storage medium, the computer program product causing a signal processing device to execute a method of setting parameters, the signal processing device subjecting an input signal to signal processing using one set of parameters, the signal processing device including: a parameter memory that stores therein a plurality of sets of prepared parameters; and a first control knob that can be moved over a predetermined operating range, each of the plurality of sets of prepared parameters being respectively assigned to each of the plurality of predetermined positions defined in the predetermined operating range, the computer program product causing the signal processing device to execute:

reading out two sets of prepared parameters, assigned to two positions adjacent to a current operating position of the first control knob, from the parameter memory; and interpolating the two sets of prepared parameters in accordance with the current operating position of the first control knob to obtain one set of interpolated parameters, wherein the input signal is subjected to the signal processing using the one set of interpolated parameters.

11. The computer program product as claimed in claim 10, wherein the signal processing device further includes a second control knob, wherein the computer program product further causes the signal processing device to execute:

generating two or more offset values corresponding to two or more parameters in the one set of interpolated parameters in accordance with a current operating position of the second control knob; and respectively modifying values of the two or more parameters in the one set of interpolated parameters in accordance with the corresponding offset values to obtain one set of modified parameter, and wherein the input signal is subjected to the signal processing using the one set of modified parameters.

\* \* \* \* \*